(12) United States Patent
Yoo et al.

(10) Patent No.: US 11,340,880 B2
(45) Date of Patent: May 24, 2022

(54) APPLICATION MANAGEMENT SERVICE INCLUDING PACKAGE FILE

(71) Applicant: Hewlett-Packard Development Company, L.P., Spring, TX (US)

(72) Inventors: Myung Han Yoo, Seongnam-si (KR); Shivaun Albright, Palo Alto, CA (US); Shane R. Konsella, Boise, ID (US); Jorge Miguel Del Hierro, San Diego, CA (US); Ajay Sharma, Huntington Beach, CA (US); Andrey Stepanov, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/051,560

(22) PCT Filed: May 17, 2018

(86) PCT No.: PCT/US2018/033088
§ 371 (c)(1),
(2) Date: Oct. 29, 2020

(87) PCT Pub. No.: WO2019/221732
PCT Pub. Date: Nov. 21, 2019

(65) Prior Publication Data
US 2021/0089290 A1    Mar. 25, 2021

(51) Int. Cl.
*G06F 8/61*    (2018.01)

(52) U.S. Cl.
CPC . *G06F 8/62* (2013.01); *G06F 8/61* (2013.01)

(58) Field of Classification Search
CPC ..... G06F 8/61; G06F 8/62; G06F 8/65; G06F 8/71
USPC .......................................................... 717/178
See application file for complete search history.

(56) References Cited

U.S. PATENT DOCUMENTS

| | | | |
|---|---|---|---|
| 9,223,990 B2 | 12/2015 | Jeong et al. | |
| 2011/0231838 A1* | 9/2011 | Wookey | G06F 8/658 717/170 |
| 2014/0208294 A1* | 7/2014 | Randhir et al. | G06F 8/71 717/115 |
| 2016/0162275 A1* | 6/2016 | Morley et al. | G06F 8/65 717/170 |
| 2017/0357498 A1* | 12/2017 | Amiga et al. | G06F 8/65 |

FOREIGN PATENT DOCUMENTS

| | | |
|---|---|---|
| EP | 2 641 407 B1 | 1/2017 |
| JP | 2007-213438 A | 8/2007 |
| JP | 2011-243121 A | 12/2011 |
| KR | 10-2012-0057871 A | 6/2012 |

(Continued)

*Primary Examiner* — Wei Y Zhen
*Assistant Examiner* — Mohammed N Huda
(74) *Attorney, Agent, or Firm* — Jefferson IP Law, LLP (57) ABSTRACT

A method for an application management service is provided. In the method, a request for a list of available applications is received and a list of available applications is generated based on a whitelist. The list of available applications is transmitted and a selection of an available application is received. A package file corresponding to the selected application is generated and the package file and an installation file corresponding to the selected application are transmitted.

13 Claims, 10 Drawing Sheets

(56) References Cited

FOREIGN PATENT DOCUMENTS

| KR | 10-2016-0012030 A | 2/2016 |
| KR | 10-2018-0007883 A | 1/2018 |
| WO | WO-2013/059138 A1 | 4/2013 |

\* cited by examiner

APPLICATION MANAGEMENT SERVICE INCLUDING PACKAGE FILE

BACKGROUND

An application may be developed, downloaded, and installed on a user or client device. When an error relating to the application occurs, such as a security issue, the user or client should be alerted to the error to avoid use of the application and other users and clients should be prevented from selecting and downloading the application.

BRIEF DESCRIPTION OF THE DRAWINGS

Various examples will be described below by referring to the following figures, in which.

In the following description, the same drawing reference numerals are used for the same elements, even in different drawings. Sizes of elements may be enlarged and illustrated in the attached drawings for convenience of description, and ratios of the elements may be exaggerated or reduced.

DETAILED DESCRIPTION

Hereinafter, examples of the invention will be described with reference to the accompanying drawings. This invention may, however, be modified in many different forms and should not be construed as limited to the examples set forth herein. To more clearly describe the examples, a detailed description of contents widely known to those skilled in the art will be omitted for clarity.

It will be understood that when an element (for example, a first element) is referred to as being "coupled with/to" or "connected to" another element (for example, a second element), it can be directly connected or coupled to the other element or intervening elements (for example, third elements) may be present. Unless otherwise described, any portion including any element may refer to the portion further including other elements not excluding the other elements.

Although terms such as, "first," "second," etc. may be used herein to describe various elements, these terms are used without regard to the order and/or importance of the elements and the elements should not be limited by these terms. Rather, these terms are merely used to distinguish one element from another. For example, a first element may be termed a second element, and, similarly, a second element may be termed a first element.

A singular expression may also include the plural meaning as long as it does not conflict in the context. For example, the terms "include" and "comprise" designate the presence of features, numbers, steps, operations, components, elements, or a combination thereof that are written in the specification, but do not exclude the presence or possibility of an additional one or more other features, numbers, steps, operations, components, elements, or a combination thereof.

Unless otherwise defined, all terms used herein have the same meaning as commonly understood by those skilled in the art to which the examples belong.

The terms "user device," "client device," "customer device," "device," or "client" may refer to any of various types and kinds of devices. For example, they may refer to an image forming apparatus which is an apparatus that prints printing data generated in a terminal apparatus, such as an electronic device, on a recording media, such as paper. For example, the image forming apparatus may include a printer, a copier, a facsimile, a multifunction peripheral (MFP) in which functions of the printer, the copier, and the facsimile are integrated into one apparatus, and the like. The image forming apparatus may refer to any apparatus which may perform an image forming job such as the printer, the copier, and the facsimile, the MFP, a display apparatus, and the like.

As another example, the terms "user device," "client device," "customer device," "device," or "client" may refer to an electronic device such as a smart phone, a tablet device, a personal computer, a laptop computer, and the like. Each of the "user device," "client device," "customer device," "device," or "client" may have various functions for controlling the download, installation, execution, and control of applications.

The term "application" may refer to a software program that may be installed on a user or client device. An application may be developed by a vendor of the user or client device, or by a third party. An application may include a unique identifier, such as a name of the application, as well as an associated version number that denotes an iteration of the software code. An application may be installed on a user or client device as part of the device manufacture, may be installed by the vendor as part of device maintenance or update, may be requested and installed by a user of the device, and the like.

Hereinafter, examples of the present disclosure will be described with reference to the accompanying drawings.

Figure 1:
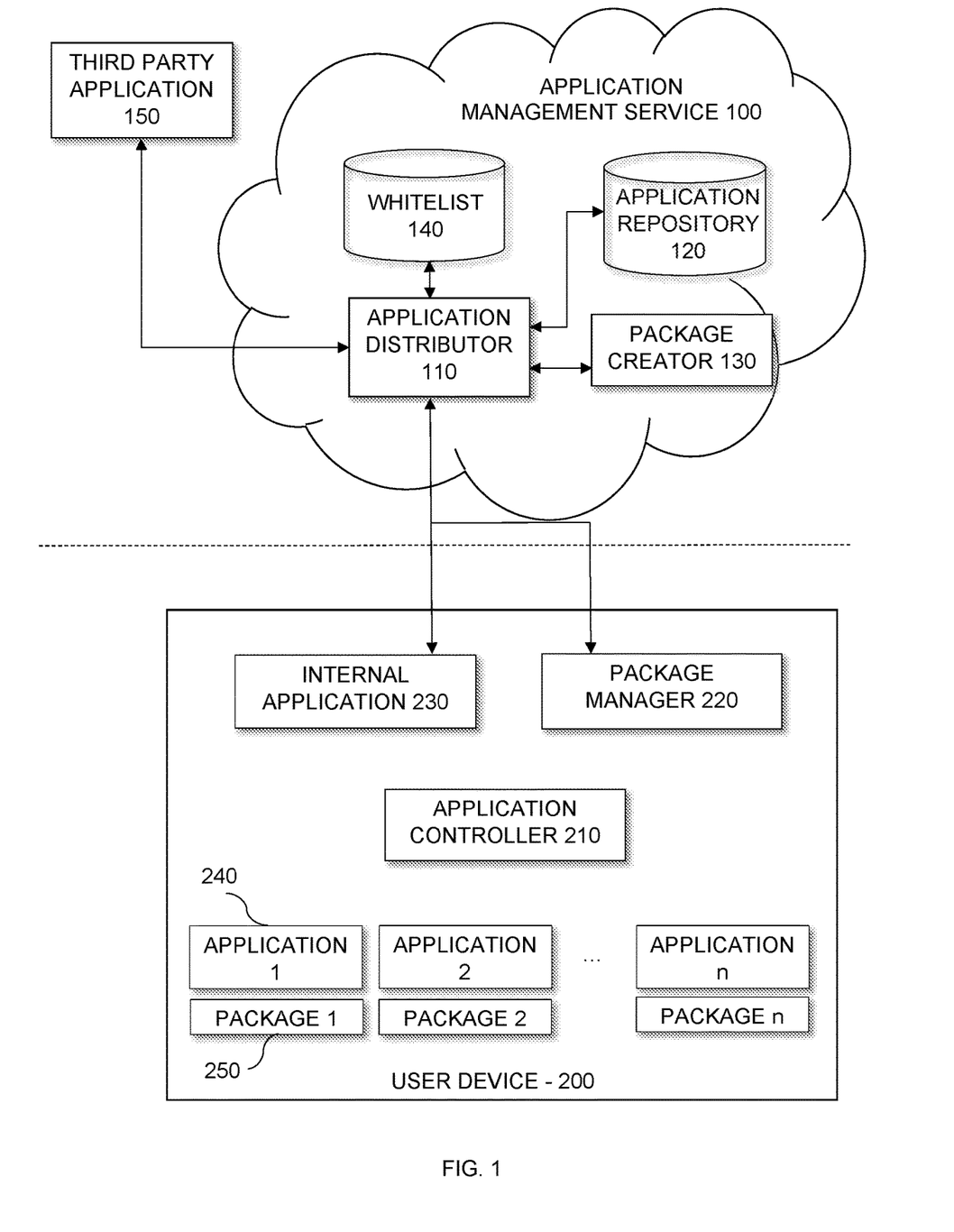
FIG. 1 illustrates an application management system according to an example.

FIG. 1 illustrates an application management system according to an example.

Referring to FIG. 1, the application management system includes an application management service 100 and a user device 200. The application management system may also include a third-party application 150.

The application management service 100 may include an application distributor 110, an application repository 120, a package creator 130, and a whitelist 140. The user device 200 may include an application controller 210, a package manager 220, an internal application 230, one or more applications 240 (e.g., APPLICATION 1, APPLICATION 2 . . . APPLICATION n), and one or more package files 250 (e.g., PACKAGE 1, PACAKGE 2, . . . PACKAGE n).

Although the application management service 100 is illustrated in FIG. 1 as a cloud-based system, it should be understood that this is merely an example and not to be considered limiting. For example, the application management service 100 may be implemented in any local or remote location with respect to the user device 200. Further, while the application distributor 110, the application repository 120, the package creator 130, and the whitelist 140 are illustrated in FIG. 1 as cloud-based, it should be understood that this is merely an example and that any or all of these components may be implemented as a cloud-based component, a local component, or a remote component.

The application management service 100 prevents a device, such as the user device 200 or the third-party application 150, from downloading or otherwise accessing an application that has an error or other problem. Further, the application management service 100 may prevent the user device 200 from executing or otherwise using an application that is already installed thereon.

According to an example, the application distributor 110 controls application management activities for the application management service 100. For example, when an application is developed, such as by a vendor of the user device 200, by the third-party application 150, or by any other developer, the application may be submitted to the application distributor 110 for various tests, evaluations, or to otherwise verify the integrity of the application. If the application distributor 110 determines that the submitted application is acceptable, identifying information of the application is included on the whitelist 140 and an application installation file corresponding to the application is included in the application repository 120. For example, a name of the application, an application identifier, a name of the developer or submitter, a version, and a status of the application may be included on the whitelist 140. Of course, this list should not be construed as limiting and the whitelist may include more or less information as needed or desired. By being placed on the whitelist 140, the application is considered acceptable for use, such as by the user device 200 or the third-party application 150. An example of the whitelist 140 is illustrated in Table 1.

a user and may receive a selection of an application from the list of available applications by the user. In that case, the internal application 230 communicates the selection of the application to the application distributor 110.

Based on receipt of the application selection from the internal application 230, the application distributor 110 communicates with the application repository 120 and the package creator 130. The application repository 120 stores the application installation files for all applications included on the whitelist including the application installation file corresponding to the selected application. The application distributor 110 will retrieve the corresponding application installation file from the application repository 120 and transmit the application installation file for installation at the user device 200.

The package creator 130 generates or otherwise creates a package file corresponding to the selected application. The package file may include a certification, a digital signature, an authorization, or other indication that the application may be executed or otherwise used by the user device 200. The package file may also include a unique identification corresponding to the installation file. As an example, the package file may share the unique application identifier or the application version as seen in Table 1. Alternatively, the package file may include another indication that correlates the package file to the application installation file. The package file corresponding to the selected application is generated by the package creator 130 based on receipt from the application distributor 110 of a request for the package file.

After receipt of the application installation file and package file corresponding to the selected application, the application distributor 110 provides the application installation file and package file to the package manager 220 of the user device 200. The package manager 220 installs the application installation file and the package file at the user device 200 for the selected application. In the illustrated example of FIG. 1, the package manager 220 may install an application installation file 240 (e.g., APPLICATION 1, APPLICATION

TABLE 1

| Name | Application Identifier | Submitter | Version | Status |
|---|---|---|---|---|
| App1 | Ajlhsfd87345jkhagsfh87634 . . . | abc@hp.com | 1.00 | Published |
| App2 | A87123kjhsLKHASDFH8299 . . . | xyz@dev.com | 1.10 | Unpublished |
| App2 | Oiue43iukjlDFF34SF4kljd34 . . . | qwe@dev.com | 1.18 | Archived |

The application distributor 110 may receive a request, from either the internal application 230 of the user device 200 or from the third-party application 150, to provide a list of available applications. Upon receipt of the request, the application distributor 110 retrieves the list of available applications from the whitelist 140 and provides the retrieved list to either the internal application 230 of the user device 200 or to the third-party application 150 that requested the list. By providing the list of applications retrieved from the whitelist 140, the application distributor 110 is able to prevent the distribution of an application that has an error or other problem. That is, if an application is not included on the whitelist 140, it is not included on the list of available applications.

In an example in which the list of available applications is requested by the internal application 230 of the user device 200, the application distributor 110 provides the list of available applications to the internal application 230. Upon receipt of the list of available applications, the user device 200 may present the list of available applications to 2, APPLICATION n) and a package file 250 (e.g., PACKAGE 1, PACKAGE 2, PACKAGE n) for each application on the user device 200.

In the event that an application is determined to have an error, a security issue, a memory leak, or other problem, the application should be prevented from installation on user devices and should be prevented from use by a device on which the application is already installed. To prevent installation on a user device, the affected application will be removed from the whitelist 140 and thus not included on a list of available application provided to a requesting user device. As an example, if an application is tested by an administrator of the application management system 100 or otherwise found to have an error or other problem as described above, the application distributor 110 may remove the corresponding application from the whitelist 140 so that the application is not included on a list of available applications.

Furthermore, to prevent use of the application, the application distributor 110 may send an instruction, request, or other message to the package manager 220 of the user device 200, the third-party application 150, or any other device that has previously requested the application determined to have the error. Upon receipt of the instruction, the device may remove the package file associated with the application having the error from the device. By removing the package file, the user device or third-party application is unable to execute the application corresponding to the removed package file.

Figure 2A:
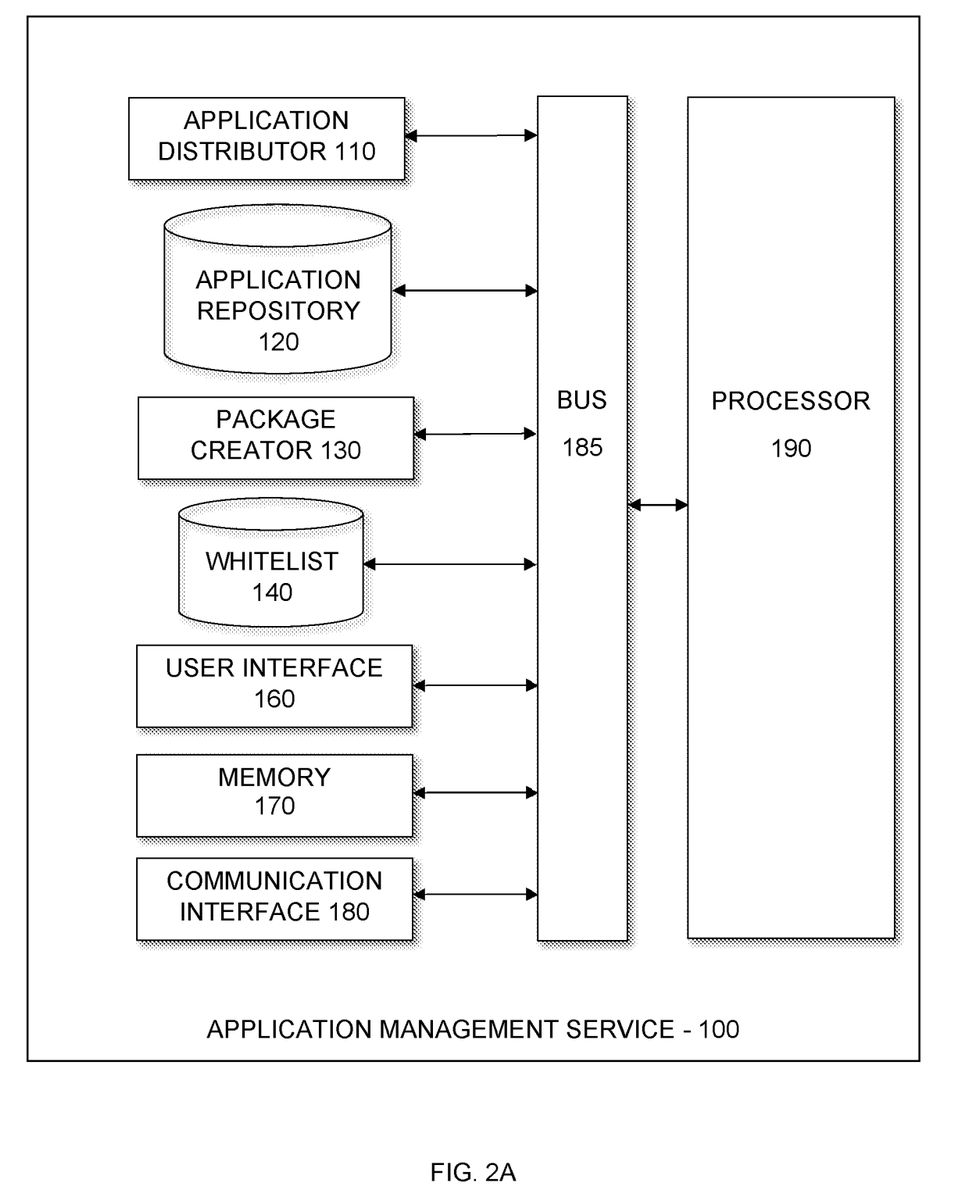
FIG. 2A is a block diagram providing a more detailed example of an application management service.

FIG. 2A is a block diagram providing a more detailed example of an application management service.

Referring to FIG. 2A, the application management service 100 may include the application distributor 110, the application repository 120, the package creator 130, the whitelist 140, a user interface 160, a memory 170, a communication interface 180, a bus 185, and a processor 190. Although not illustrated in FIG. 2A, the application management service 100 may further include other components such as a power supplier for supplying power to each component of the application management service 100. Further, depending on implementation, various of the illustrated components may be omitted or combined. For example, if the application management system 100 is implemented as a cloud-based system that is controlled remotely, the user interface 160 or certain of its functions may be omitted.

The application distributor 110 controls application management activities for the application management service. For example, the application distributor 110 may receive a request for available applications from a user device or a third-party application. In that case, the application distributor 110 may retrieve the list of available applications from the whitelist 140 and send the list of available applications to the user device or a third-party application in response to the request.

The application distributor 110 may receive from the user device or the third-party application a selection of an application from the list of available applications. In that case, the application distributor 110 may retrieve an application installation file corresponding to the selected application from the application repository 120 and request the package creator 130 to generate or otherwise create a package file corresponding to the selected application. The application distributor 110 may transmit both the application installation file and the package file to the user device or the third-party application that requested the application. The application distributor 110 may also maintain a list of the user devices and third-party applications to which the application has been sent, for example by saving such a list in the memory 170. In an example, the list of user devices and third-party applications may include identifying information exchanged during a request for available applications.

The application distributor 110 may receive a request to remove an application from the whitelist 140. For example, if an application is determined to have error or other problem, a developer of the application, an administrator of the application management service, or other party may determine that the application should not be used. In that case, the application distributor 110 may receive a request or other notification that the application should not be used and remove the affected application from the whitelist 140, for example by deleting the affected application from the whitelist 140. The application distributor 110 may also refer to the list of devices to which the affected application has been previously sent and request those devices to remove the package file corresponding to the affected application.

The application repository 120 may be implemented as a database, a memory, or other storage for installation files of applications. The application repository 120 may receive a request for an application installation file from the application distributor 110 and provide the requested application installation file to the application distributor 110.

The package creator 130 creates a package file corresponding to a selected application. The corresponding package file is intended to be installed at a user device via internal application 230 or third-party application that selects an application from a list of available applications provided by the application distributor 110. By installation of the package file, the user device or third-party application is able to quickly determine if an application is safe or otherwise acceptable for use.

The package file may include a certification, a signature, an authorization, or other indication that the application may be executed or otherwise used by a user device or a third-party application. The package file may also include a unique identification corresponding to the installation file. As an example, the package file may share the unique application identifier or the application version as seen in Table 1. Alternatively, the package file may include another indication that correlates the package file to the application installation file. The package file corresponding to the selected application is created based on receipt from the application distributor 110 of a request for the package file.

The whitelist 140 may be implemented or installed on a database, a memory, or other storage that allows for listing or registration of applications that have been determined acceptable for installation at a user device or third-party application. A list of available applications based on the whitelist 140 may be provided to the application distributor 110 upon request and provided to a user for selection of an available application. By implementation and use of the whitelist 140, it is possible to prevent a user device or third-party application from downloading and installing an application that has an error or otherwise should not be used.

The user interface 160 may include a plurality of function keys with which a user may set or select various functions supported in the application management service 100. For example, the user interface 160 may be implemented with a device such as a mouse or a keyboard. In another example, the user interface 160 may be implemented with a touch screen which simultaneously performs the function of a display. The user interface 160 may receive an input from an administrator or other user of the application management service 100 to include an application on the whitelist 140, to remove an application from the whitelist 140, to control the functions of the application distributor 110, or any of various other commands relating to operation of the application management service 100.

The memory 170 may store programs or data used for execution or control of the application management service 100. For example, the processor 190 may execute a program stored in the memory 170, read data or a file stored in the memory 170, or store a new file in the memory 170. Also, the memory 170 may be used with or in place of the whitelist 140 to store a list of applications that have been determined acceptable for use. Furthermore, the memory 170 may store identification or other data of user devices or third-party applications that have requested and received applications from the whitelist 140. In that case, if it is determined that an error or other problem exists on an application that was previously downloaded to a user device or third-party application, the identification or other data may be used by the application distributor 110 to transmit a request for removal of the package file corresponding to the affected application.

The communication interface 180 may couple the application management service 100 to an external apparatus, such as a user device or a third-party application, using a local area network (LAN), an Internet network, or any other applicable communication network. In another example, the communication interface 120 may couple the application management service 100 to the external apparatus using a universal serial bus (USB) port and a wireless module. In this example, the wireless module may be WiFi, WiFi Direct, near field communication (NFC), Bluetooth, and the like.

The communication interface 180 may receive a request for a list of available applications or a request for a selected application and may transmit the list of available applications or an installation file and a package file corresponding to a selected application. If it is determined that an application has an error or other problem such that the application is removed from the whitelist 140, the communication interface 180 may transmit an instruction or request to a user device or third-party application that has previously requested and received the application so that the package file corresponding to the affected application may be removed.

The bus 185 may provide an internal communication interface between the other components. For example, a request by the application distributor 110 for a list of available applications from the whitelist 140 may be transmitted and received using the bus 185. Similarly, the bus 185 may provide communication between the processor 190 and the memory 170 for transmission and reception of a program stored in the memory 170 for use by the processor 190.

The processor 190 may control various operations of the application management service 100, and may include at least one processor, such as a central processing unit (CPU). The processor 190 may control the components included in the application management service 100 to perform an operation corresponding to a user input received through the user interface device 160. The controller 120 may include at least one specialized processor for each function or may be an integrated processor.

Figure 2B:
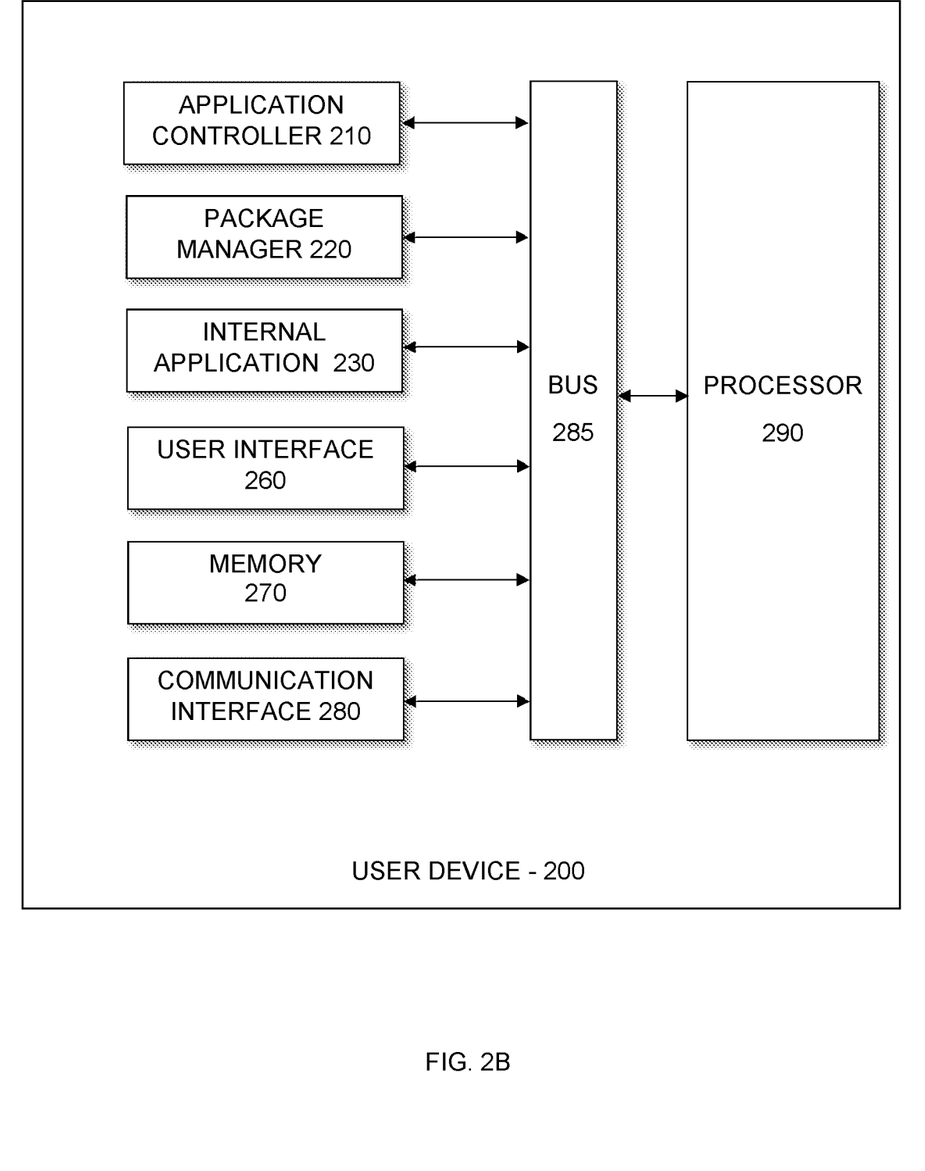
FIG. 2B is a block diagram providing a more detailed example of a user device.

FIG. 2B is a block diagram providing a more detailed example of a user device.

Referring to FIG. 2B, the user device 200 may include the application controller 210, the package manager 220, the internal application 230, a user interface 260, a memory 270, a communication interface 280, a bus 285, and a processor 290. Also, although not illustrated in FIG. 2, the device 200 may further include other components such as a power supplier for supplying power to each component of the device 200.

The application controller 210 may determine whether to execute an application installed on the user device 200. For example, when a user selects to execute or otherwise use an installed application, the application controller 210 may determine if a package file corresponding to the selected application exists in the memory 270. If the application controller 210 determines that a corresponding package file does not exist in the memory 270, the application controller 210 determines that the application should not be executed or otherwise used and terminates the application. As an example, if the application controller 210 determines that the corresponding package file does not exist for a selected application, the application controller 210 may cause an error message to be displayed on the user interface 260 and terminate the application.

The package manager 220 receives an application installation file and a corresponding package file from an application distributor (e.g., application distributor 110). For example, when a user selects an application for download to the user device 200 such that an application installation file and a package file corresponding to the selected application are received from an application distributor, the package manager 220 installs the application installation file and the package file in the memory 270. If the user selects to uninstall the application, the package manager 220 may receive an instruction to remove the application installation file and the package file corresponding to the application selected to be uninstalled from the memory 270. As another example, if it is determined that an installed application has an error and has been removed from a whitelist (e.g., the whitelist 140), the package manager 220 may receive an instruction to remove the package file corresponding to the application having the error. In that case, if the package file corresponding to an application having an error has been removed from the memory 270, the application controller 210 would be unable to execute the application as described above. Thus, a user is prevented from using such an application.

The internal application 230 may request, from an external component such as an application distributor, a list of available applications and receive the list of available applications through the communication interface 280. The internal application 230 may transmit a selection of an application from the list of available applications, through the communication interface 280, to the external component that provided the list. The internal application 230 may be a program or other component that is installed by a manufacturer of the user device 200 or may be installed by a user at a later time.

The user interface 260 may include an input unit for receiving, from a user, an input for selecting an application from a list of applications or for selecting to execute an installed application, and an output unit for displaying information, such as a result of executing a selected application, a list of available applications, or an error message resulting from an attempt to execute an application having an error. For example, the user interface 260 may include an operation panel for receiving a user input and a display panel for displaying a screen.

As an example, the input unit may include at least one of devices for receiving various types of user inputs, such as a keyboard, a physical button, a touch screen, a camera, and a microphone. Also, the output unit may include, for example, a display panel or a speaker. However, the disclosure is not limited thereto, and the user interface 260 may include at least one device supporting various inputs and outputs.

Various types of data, such as a file or a program like an application, may be installed and stored in the memory 270. The processor 290 may access the data stored in the memory 270 to use the data or may store new data in the memory 270. Also, the processor 290 may execute a program installed in the memory 270 and may install an application received from an external source through the communication interface 260 in the memory 270.

The memory 270 may store application installation files, package files corresponding to the application installation files, any of various programs executed by the user device 200, any of various data generated by the user device 200 during operation, and the like.

The communication interface 280 may communicate with another device or a network in a wired or wireless manner. For example, the communication interface may communicate with an application management service, such as the application management service 100 of FIG. 1. Accordingly, the communication interface 280 may include a communication module supporting at least one of various wired and wireless communication methods. For example, the communication module may be in a form of a chipset or may be a sticker or a bar code (for example, a sticker including a near field communication (NFC) tag) including information required for communication.

Wireless communication may include, for example, at least one of wireless fidelity (Wi-Fi), Wi-Fi direct, Bluetooth, ultra wideband (UWB), NFC, and the like. Wired communication may include, for example, at least one of universal serial bus (universal serial bus), high definition multimedia interface (HDMI), and the like.

The communication interface 280 may transmit a signal or data received from an application management service to the processor 290, or transmit a signal or data generated by the processor 290 to the application management service. For example, the communication interface 280 may receive an application installation file, a package file, a request to uninstall a package file, and the like.

The bus 285 may provide an internal communication interface between the other components. For example, the bus 285 may exchange signals between the user interface 260 and the application controller 210 when a user of the user device 200 desires to execute an installed application. In that case, the bus 285 may further provide an exchange of signals between the memory 270, the processor 290, and the user interface 260 to implement the user's request. Similarly, the bus 285 may provide communication between the processor 290 and the memory 270 for transmission and reception of a program stored in the memory 270 for use by the processor 290.

The processor 290 controls overall operations of the user device 200, and may include a processor, such as a central processing unit (CPU). The processor 290 may control other components included in the user device 200 such that an operation corresponding to a user input received through the user interface 260 is performed. For example, the processor 290 may execute an application stored in the memory 270, read a file stored in the memory 270, store a new file in the memory 270, and the like.

Figure 3:
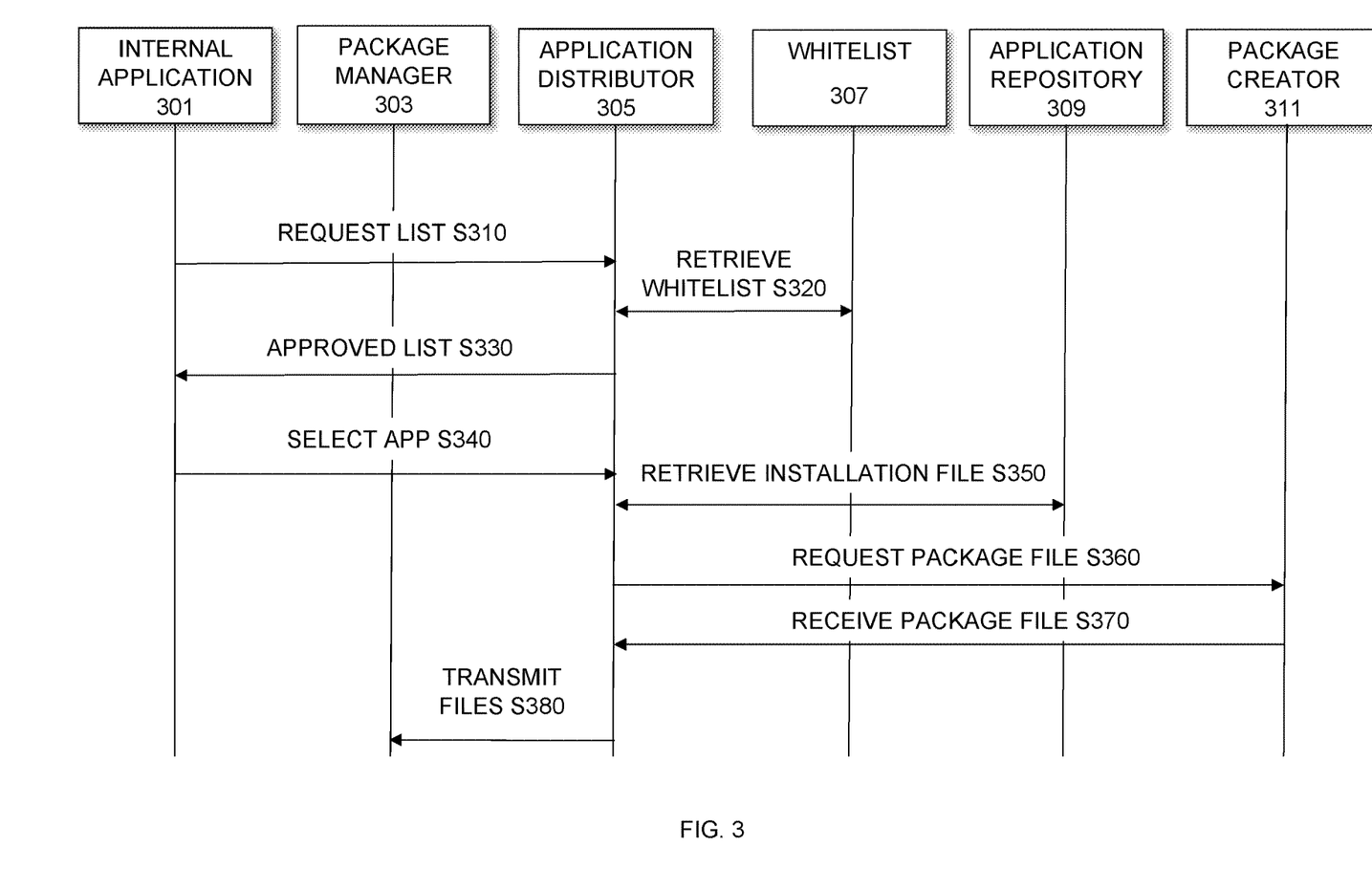
FIG. 3 is a flow diagram illustrating a method of requesting and installing an application according to an example.

FIG. 3 is a flow diagram illustrating a method of requesting and installing an application according to an example.

Referring to FIG. 3, a user of a user device may desire to install an application. In that case, the user may enter a request for available applications and an internal application 301 of the user device may send a request to an application distributor 305 of an application management service for a list of available applications in operation S310. Upon receipt of the request, the application distributor 305 retrieves a list of available applications from a whitelist 307 in operation S320 and transmits the list of available applications to the internal application 301 in operation S330. The list of available applications is presented to the user, such as being displayed upon a user interface 260 and the user interface 260 may receive a selection of a desired application from the user. Upon selection of a desired application for installation, the internal application 301 transmits the selection to the application distributor 305 in operation S340. Upon receipt of the application selection, the application distributor 305 retrieves an application installation file corresponding to the selected application from the application repository 309 in operation S350. The application distributor 305 also transmits a request for a package file corresponding to the selected application to the package creator 311 in operation S360. In transmitting the request for the package file corresponding to the selected application, the application distributor 305 may also transmit identifying information of the selected application to the package creator 311. For example, the application distributor may transmit information from Table 1 corresponding to the selected application to be added to the package file by the package creator 311. In operation S370, the package creator 311 transmits the created package file to the application distributor 305. In operation S380, the application distributor 305 transmits the files to the package manager 303 of the user device for installation at the user device.

Figure 4:
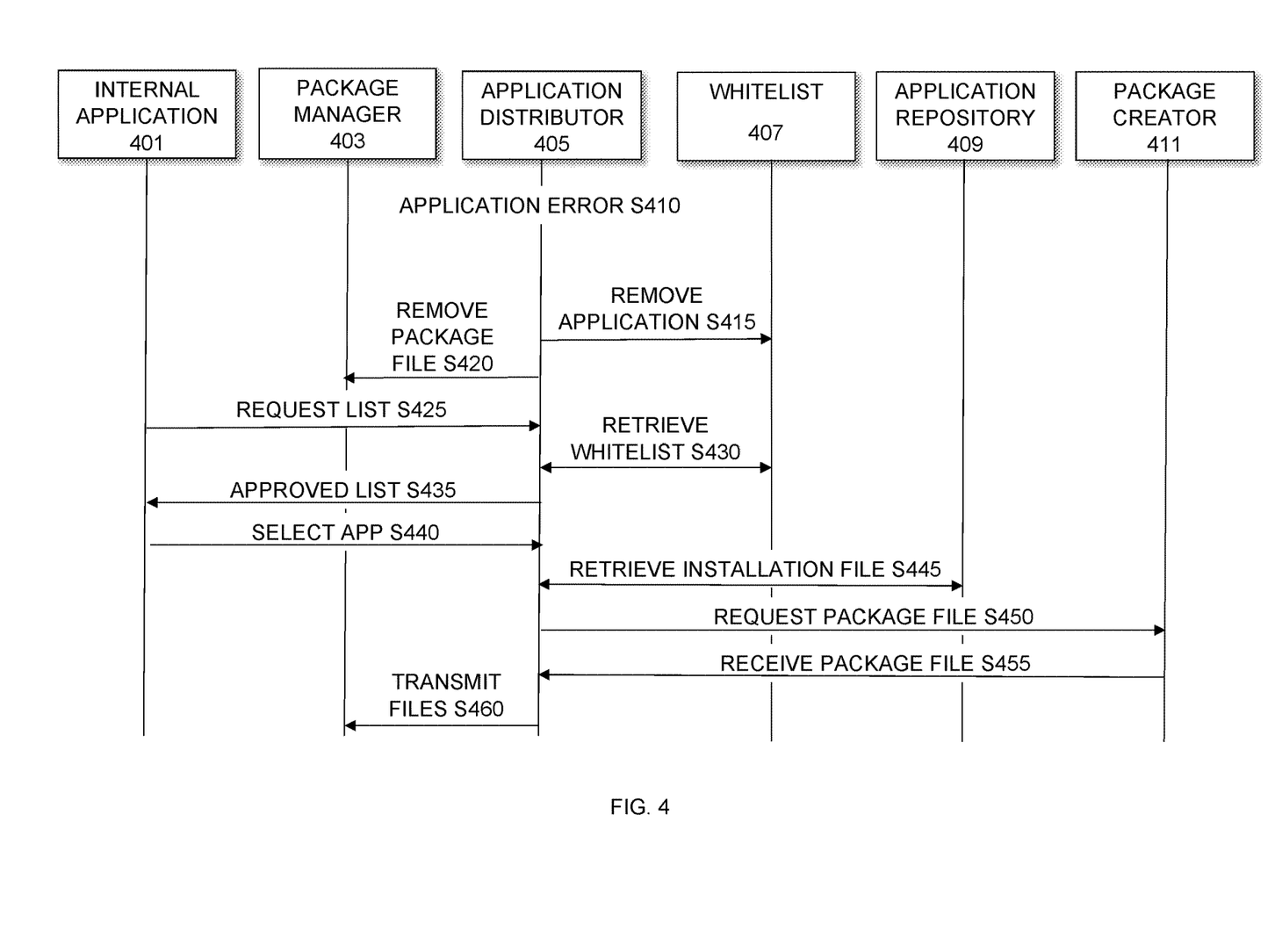
FIG. 4 is a flow diagram illustrating a method when an application is removed from a whitelist according to an example.

FIG. 4 is a flow diagram illustrating a method when an application is removed from a whitelist according to an example.

Referring to FIG. 4, an application distributor 405 may be made aware that an application currently included on a whitelist 407 has an error or other problem in operation S410. The application distributor 405 may be made aware of the application error by receiving an input from an administrator of an application management service, by receiving feedback from a user device or third-party application, by receiving test results or analysis of the application, etc. In operation S415, the application distributor 405 transmits an instruction or other request to the whitelist 407 to remove the application having the error. In operation S420, the application distributor 405 determines a list of devices to which the application having the error has been previously provided and transmits an instruction or other request to the package manager 403 of such a device to remove the package file corresponding to the application having the error. In an example, the application distributor 405 may include an internal memory or other storage device that lists identification information of user devices or third-party applications to which the application having the error has been provided. Upon receipt of the instruction from the application distributor 405 to remove the package file, the package manager 403 removes the package file, such as by deleting the package file from an internal memory of the user device. In that case, if a user subsequently selects to execute the application, such execution will not be possible because the corresponding package file is no longer installed.

After removal of the application having the error from the whitelist 407, a request may be made by an internal application 401 for a list of available applications and an operation similar to that explained in FIG. 3 may occur. In that regard, operations S425 and S440 to S460 are substantially the same as respective operations S310 and S340 to S380 of FIG. 3 and will not be explained in detail.

In operation S430, when the application distributor 405 retrieves the list of available applications from the whitelist 407, the application removed from the whitelist 407 in operation S415 will no longer be included in the list of available applications. Thus, in operation S435, the list of available applications provided to the internal application 401 will also not include the application removed from the whitelist 407 such that the application having the error is prevented from use by a user device or third-party application.

Figure 5:
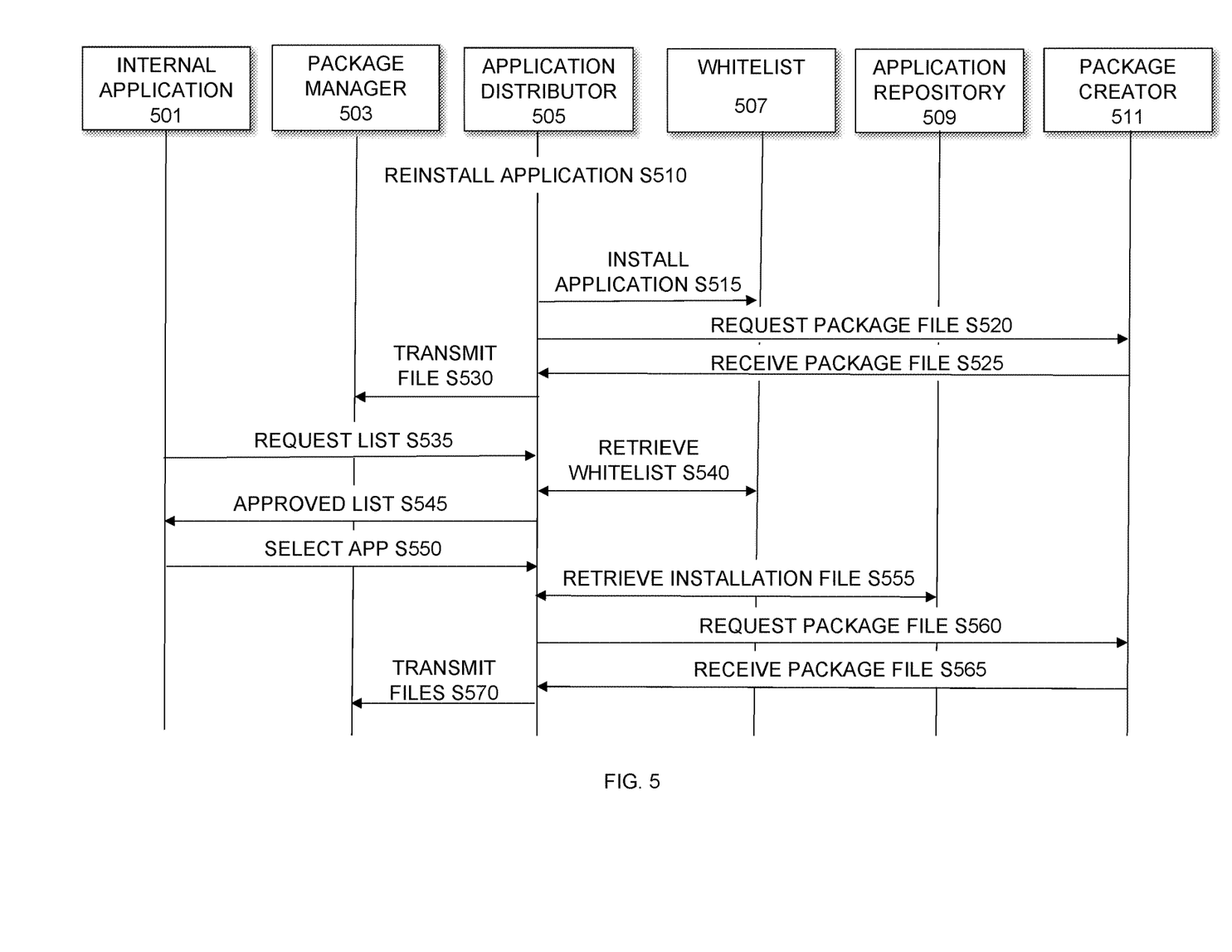
FIG. 5 is a flow diagram illustrating a method when an application is replaced onto a whitelist after being previously removed according to an example.

FIG. 5 is a flow diagram illustrating a method when an application is replaced onto a whitelist after being previously removed according to an example.

Referring to FIG. 5, when an application having been previously removed from a whitelist 507 is again available for use based on error correction or other remedial process, the application may be replaced on the whitelist 507 and the user devices and third-party applications having previously installed the application may be able to again use the application.

In operation S510, an application distributor 505 may be made aware that an application previously removed from the whitelist 507 is again available for use by way of error correction or other necessary actions relating to the application. As an example, the application distributor 505 may receive an instruction from an administrator of the application management service that the application is acceptable for use. In operation S515, the application distributor 505 transmits an instruction and identifying information to the whitelist 507 to include the affected application on the whitelist 507. In operation S520, the application distributor 505 requests the package creator 511 to create a package file corresponding the application replaced on the whitelist 507 and in operation S525 receives the package file created by the package creator 511. In operation S530, the application distributor 505 determines a list of devices to which the application having the error was previously provided and transmits the package file corresponding to the application to the package manager 503 of such a device. The transmission of operation S530 may also include an instruction or request to install the package file corresponding to the application previously having an error. In an example, the application distributor 505 may include an internal memory or other storage device that lists identification information of user devices or third-party application to which the application having the error was been provided.

After again listing the application previously having the error on the whitelist 507, a request may be made by an internal application 501 for a list of available applications and an operation similar to that explained in FIG. 3 may occur. In that regard, operations S535 and S550 to S570 are substantially the same as respective operations S310 and S340 to S380 of FIG. 3 and will not be explained in detail.

In operation S540, when the application distributor 505 retrieves the list of available applications from the whitelist 507, the application reinstalled on the whitelist 507 in operation S515 will again be included in the list of available applications. Thus, in operation S545, the list of available applications provided to the internal application 501 will include the application having been listed again on the whitelist 507. In that case, the user device or third-party application is provided applications that have been approved for use.

Figure 6:
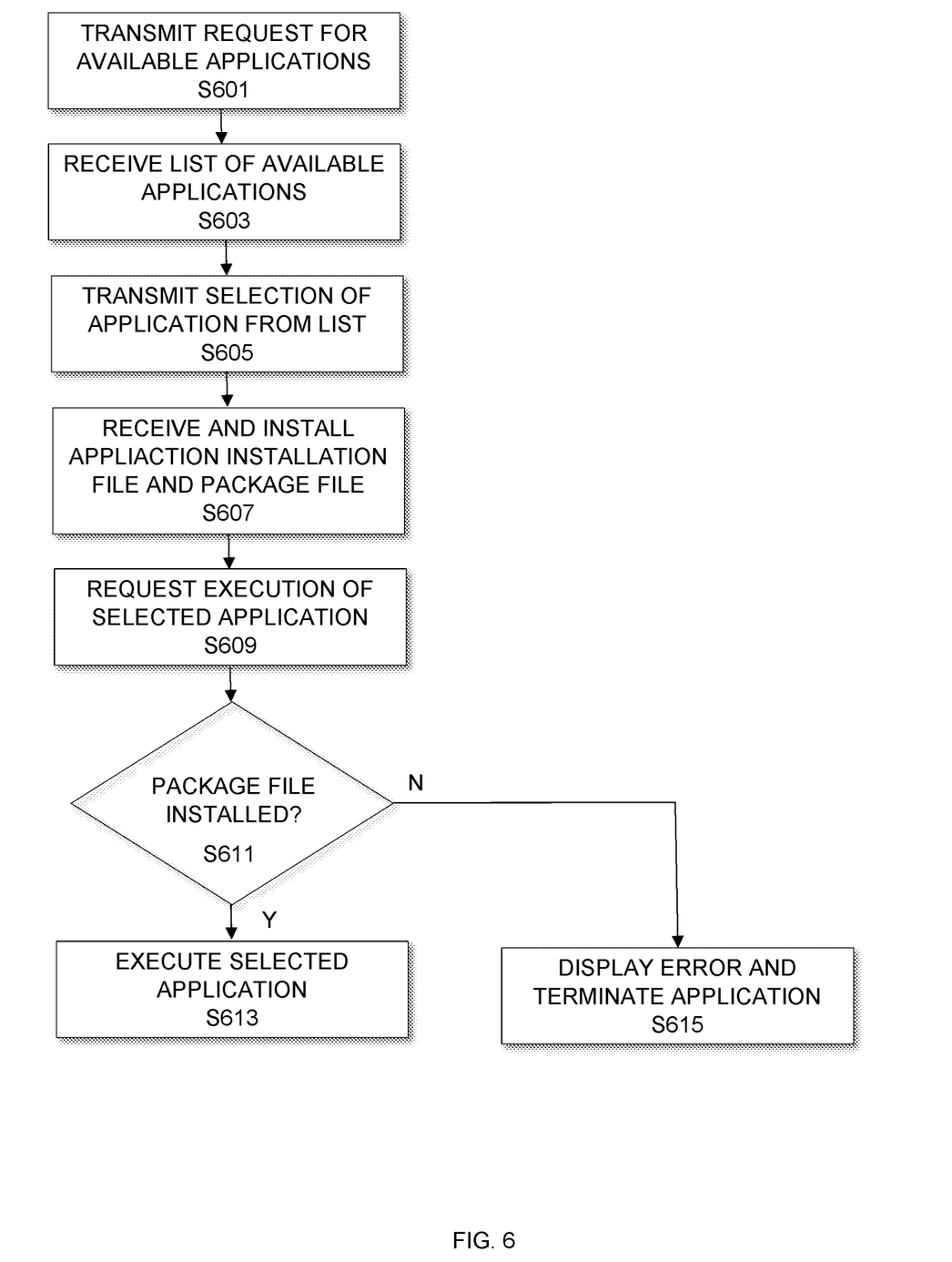
FIG. 6 is a flowchart illustrating a method by a user device according to an example.

FIG. 6 is a flowchart illustrating a method by a user device according to an example.

Referring to FIG. 6, a user device may request a list of available applications from an application management service in operation S601. As an example, a user of a user device may execute an internal application and input a request for a list of available applications using a user interface. In operation S603, the user device may receive a list of available applications from the application management service. As an example, the list of available applications may be provided to the internal application and caused to be displayed on the user interface. In operation S605, the user device may transmit a request for a selected application to the application management service. As an example, the user device may receive a user selection using the user interface. In operation S607, the user device may receive an application installation file and a package file corresponding to the selected application from the application management service. Upon receipt, the user device installs both the application installation file and the package file in a memory or other storage of the user device. As an example, a package manager may receive and install both the application installation file and the package file corresponding to the requested application.

In operation S609, the user device may receive a request by a user to execute the selected application. For example, the user device may receive a request on the user interface for execution of the selected application from a list of installed applications. In operation S611, the user device determines if a package file corresponding to the requested application is installed. As an example, an application controller may determine if a package file corresponding to the requested application is stored in a memory of the user device. If it is determined in operation S611 that the package file corresponding to the requested application is installed, the user device proceeds to operation S613 to execute the selected application. On the other hand, if it is determined in operation S611 that the package file corresponding to the requested application is not installed, the user device proceeds to operation S615 to display an error message and terminate the application.

Figure 7:
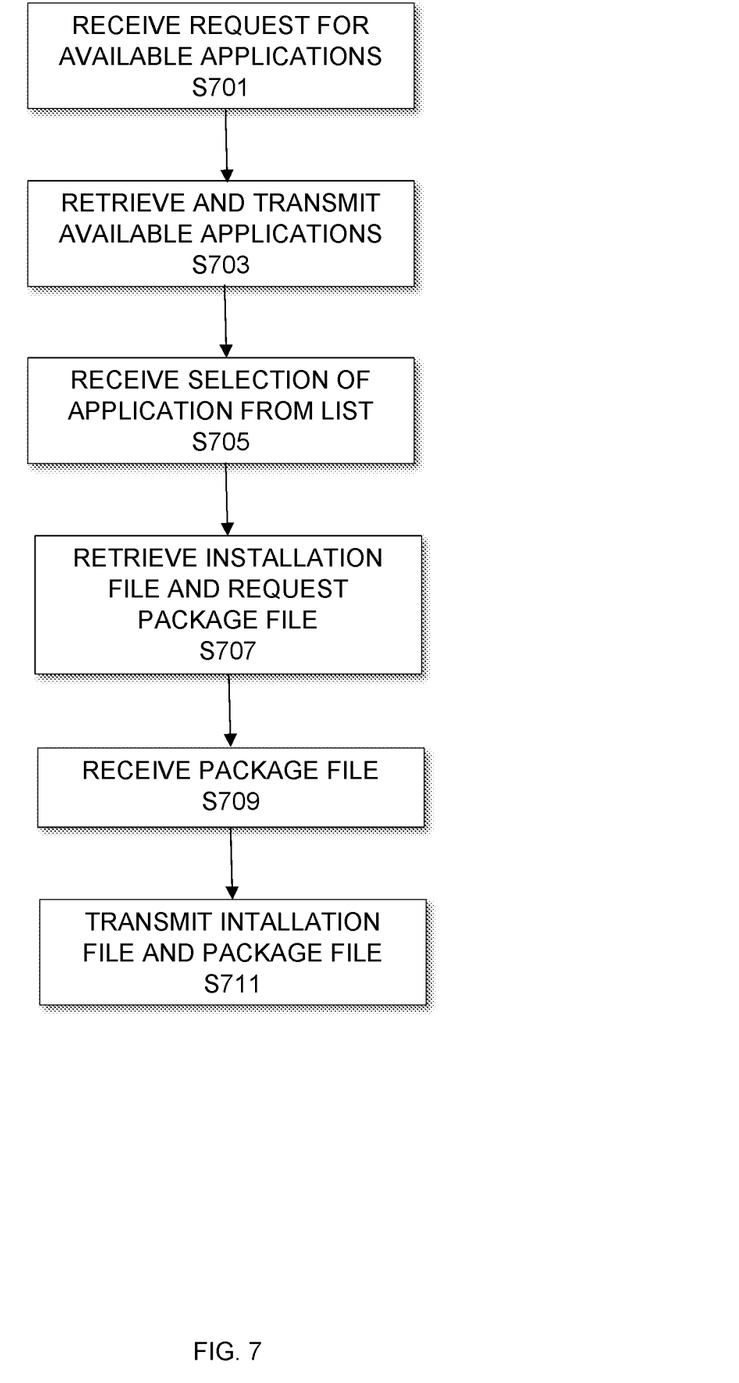
FIG. 7 is a flowchart illustrating a method by an application management service according to an example.

FIG. 7 is a flowchart illustrating a method by an application management service according to an example.

Referring to FIG. 7, an application distributor may receive a request for a list of available applications in operation S701. As an example, the application distributor may receive a request for a list of available applications from a user device or a third-party application. In operation S703, the application distributor may retrieve a list of available applications from a whitelist and provide the retrieved list as requested. As an example, the application distributor may provide the list of available applications to an internal application of the user device or a third-party application. In operation S705, the application distributor may receive a selection of an application from the list of available applications. For example, the application distributor may receive a request for an application as inputted by a user of the user device or the third-party application. In operation S707, the application distributor retrieves an application installation file corresponding to the requested application and transmits a request for a package file to a package file creator. In operation S709, the application distributor receives the requested package file and in operation S711, application distributor transmits the application installation file and the package file to the user device or the third-party application that requested the application.

Figure 8:
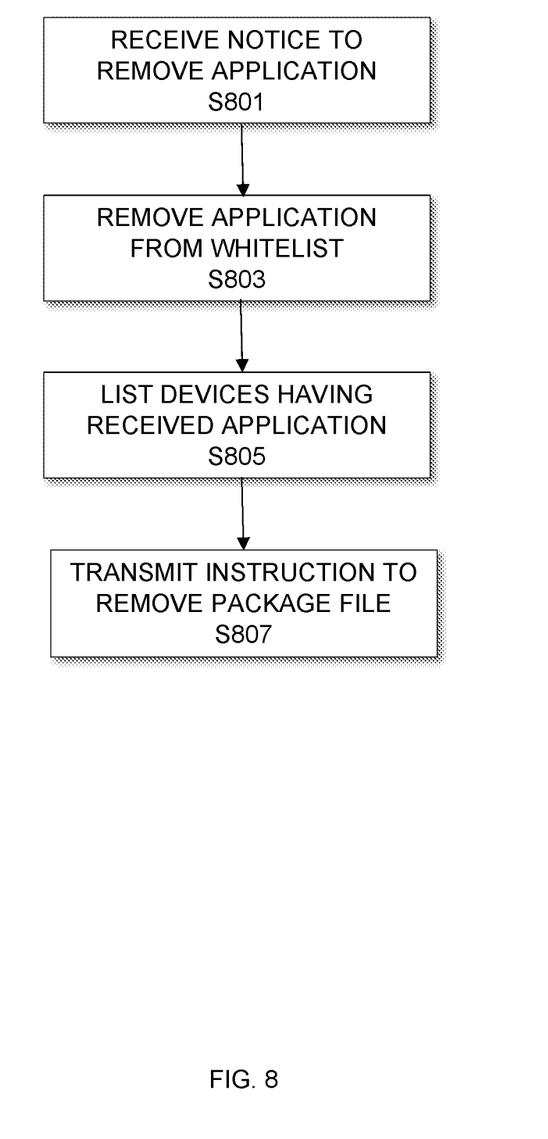
FIG. 8 is a flowchart illustrating a method by an application management service when an application is removed from a whitelist according to an example.

FIG. 8 is a flowchart illustrating a method by an application management service when an application is removed from a whitelist according to an example.

Referring to FIG. 8, the application management service receives a notice to remove an application from a whitelist in operation S801. For example, an application distributor may receive a notification or instruction from an administrator of the application management service that an application included on the whitelist has an error or other problem necessitating removal of the application from the whitelist. In operation S803, the application distributor removes the application from the whitelist. For example, the application distributor may send a request to remove the application from the whitelist or issue a command to delete the application from the whitelist. In operation S805, the application distributor determines which devices previously received the application removed from the whitelist. For example, the application distributor may retrieve a list of devices from a memory or other storage of the application management service. In operation S807, the application distributor transmits an instruction or other command to a user device or a third-party application to remove the package file associated with the application having the error.

In the method of FIG. 8, it may be determined that one of several versions of an application has an error. That is, it may be determined that several versions of an application exist on a whitelist while only one of the versions contains an error or other problem. In that example, the application distributor may receive not only a notice of the application but also a notice as to which version of the application is to be removed from the whitelist in operation S801. Further in that example, the application distributor may remove only the application having the corresponding version from the whitelist in operation S803, retrieve a list of devices having previously received that version of the application in operation S805, and transmit an instruction to remove the package file for that version of the application to the listed devices in operation S807.

Figure 9:
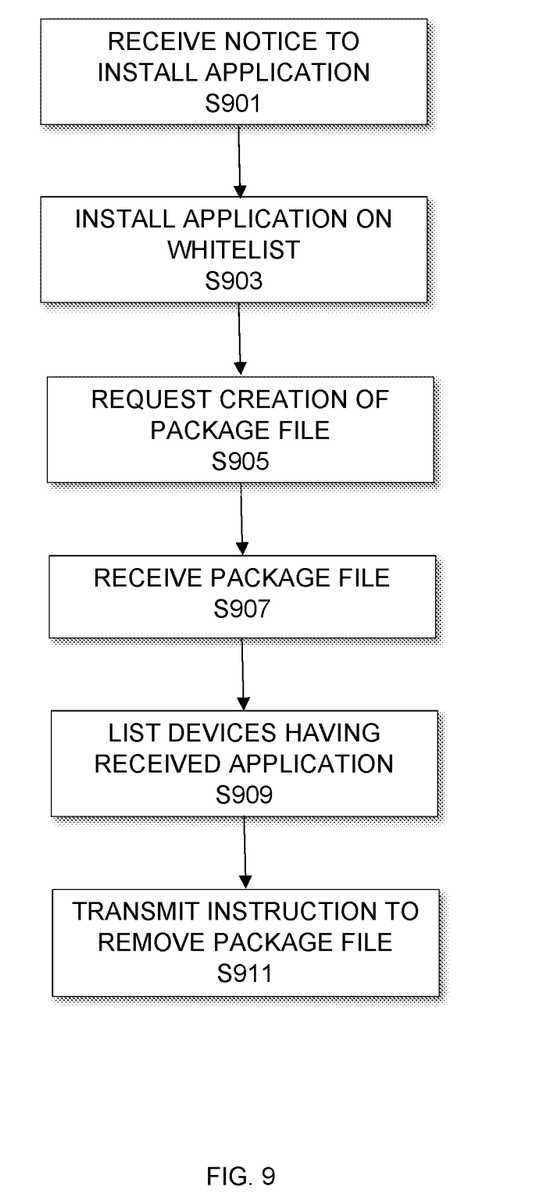
FIG. 9 is a flowchart illustrating a method by an application management service when an application is re-listed on a whitelist according to an example.

FIG. 9 is a flowchart illustrating a method by an application management service when an application is re-listed on a whitelist according to an example.

Referring to FIG. 9, the application management service receives a notice or other instruction to again list an application that was previously deleted from a whitelist on the whitelist in operation S901. As an example, an application distributor may receive a notification or instruction from an administrator of the application management service that an application that was previously determined to have an error or other problem that required removal of the application from the whitelist is now acceptable for inclusion on the whitelist. For example, an error, a security leak, or other problem that caused an application to be removed from the whitelist may have been addressed such that the application is again acceptable for listing on the whitelist.

In operation S903, the application distributor includes the application on the whitelist. For example, the application distributor may issue an instruction to install the name or other information of the application on the whitelist or issue a command to write the name or other information on the whitelist. In operation S905, the application distributor requests creation of a package file for the application that was again listed on the whitelist. As an example, the application distributor may transmit a request to a package creator to generate or provide a package file corresponding to the re-listed application. In operation S907, the application distributor receives the created package file.

In operation S909, the application distributor determines which devices previously received the application that was removed from and now re-listed on the whitelist. For example, the application distributor may retrieve a list of devices from a memory or other storage of the application management service. In operation S911, the application distributor transmits the package file for the application to a user device or third-party application. For example, the application distributor may transmit the package file to a package manager of a user device for installation of the package file on the user device. Upon installation of the package file, a user of the user device may again execute the application.

Based on the above examples, a user device or third-party application is prevented from accessing an application having a problem such as an error, a memory leak, a security issue, or the like by providing applications included on a whitelist when a request for available applications is received. Further, by creating a package file corresponding to a selected application, providing the package file to a user device or third-party application, and checking that the package file is installed on the user device or third-party application prior to execution of the selected application, an application management service is able to more easily prevent use of a problematic application that is already installed on a user device or third-party application.

Any or all of the above described methods may be embodied as at least one execution program and the execution program may be stored on a non-transitory computer readable medium. The non-transitory computer-recordable medium is not a medium to temporarily store data such as a register, a cache, or a memory but may be an apparatus-readable medium to semi-permanently store data. Specifically, the above-described various applications or programs may be stored in the non-transitory apparatus-readable medium such as a compact disc (CD), a digital versatile disc (DVD), a hard disc, a Blu-ray disc, a universal serial bus (USB), a memory card, or a read only memory (ROM), and the like.

It has been described that elements constituting the examples in the present disclosure may be combined as one or operate in a combined form, but the examples should not be considered limited thereto. For example, one or more elements among the all elements may be selectively combined and operate within the object scope of the present disclosure. Further, all the elements may be individually implemented with pieces of hardware, but all or a portion of the elements may be selectively combined and may be implemented with a computer program having program modules which perform all or a portion of functions combined in one piece of hardware or a plurality of pieces of hardware. Program codes and code segments constituting the computer program may be derived by those skilled in the art of the present disclosure. The computer program may be stored in non-transitory computer-readable media and read and executed to implement examples of the invention.

The foregoing examples and advantages are not to be construed as limiting and the above description of examples can be readily applied to other types of apparatuses. Also, the description of the examples invention is intended to be illustrative, and not to limit the scope of the claims, and many alternatives, modifications, and variations will be apparent to those skilled in the art.

What is claimed is:
1. A method by an application management service, the method comprising:
   receiving a request for a list of available applications;
   generating the list of available applications by retrieving a list of applications included on a whitelist;
   transmitting the list of available applications;
   receiving a selection of an available application;
   generating a package file corresponding to the selected application, the package file indicating that the selected application may be executed; and
   transmitting, to a device, the package file and an installation file corresponding to the selected application, the package file and the installation file to be stored by the device,
   wherein the package file includes an identifier corresponding to the installation file,
   wherein the device is to execute the application or display an error message based on whether the package file corresponding to the application is respectively stored or is not stored in a memory of the device,
   wherein the package file is generated by a package creator, and
   wherein the application installation file is retrieved from an application repository.

2. A method in accordance with the method of claim 1, comprising:
   determining that the selected application includes an error when the selected application is removed from the whitelist; and
   transmitting, to the device, a request to remove the package file corresponding to the selected application.

3. A method in accordance with the method of claim 2, wherein the request to remove the package file corresponding to the selected application is transmitted automatically upon removal of the selected application from the whitelist.

4. A method in accordance with the method of claim 2, comprising:
   generating a list of devices to which the selected application was previously provided; and
   transmitting, to each device on the generated list of devices, the request to remove the package file corresponding to the selected application.

5. A method in accordance with the method of claim 2, comprising:
   receiving a second request for the list of available applications; and
   generating the list of available applications based on the whitelist,
   wherein the list of available applications does not include the selected application.

6. A method in accordance with the method of claim 2, comprising:
   determining that the selected application having the error has been replaced on the whitelist;
   generating a second package file corresponding to the selected application; and
   transmitting, to the device, the second package file corresponding to the selected application.

7. A method in accordance with the method of claim 1,
   wherein the package file corresponding to the selected application is generated upon receiving the selection of the application,
   wherein the package file comprises a unique identifier corresponding to at least one of an identifier of the application installation file or a version of the application, and
   wherein the package file comprises at least one of a certification, a signature, or a vendor authorization corresponding to the selected application.

8. A method in accordance with the method of claim 1, wherein the request for the list of available applications is received from one of a third party application that is remote from the device or an internal application that is local to the device.

9. A device comprising:
   a memory;
   a user interface;
   a package manager to:
      receive, from an application management service, an application installation file and a package file corresponding to a selected application, the package file indicating that the selected application may be executed and including an identifier corresponding to the installation file, and
      install the application installation file and store the package file in the memory; and an application controller to:
   receive a request to execute the selected application,
   determine if the package file corresponding to the selected application is stored in the memory,
   if the package file corresponding to the selected application is stored in the memory, execute the application, and
   if the package file corresponding to the selected application is not stored in the memory, display an error message on the user interface,
   wherein the package file is generated by a package creator, and
   wherein the application installation file is retrieved from an application repository.

10. A device in accordance with the device of claim 9, comprising an internal application to:
   transmit a request for a list of available applications,
   receive the requested list of available applications, and
   transmit a selection of an available application.

11. A device in accordance with the device of claim 9, wherein the package manager:
   receives an instruction to remove the package file corresponding to the selected application, and
   removes the stored package file from the memory.

12. A device in accordance with the device of claim 9,
   wherein the package file corresponding to the selected application is generated upon receiving the selection of the application,
   wherein the package file comprises a unique identifier corresponding to at least one of an identifier of the application installation file or a version of the application, and
   wherein the package file comprises at least one of a certification, a signature, or a vendor authorization corresponding to the selected application.

13. A non-transitory machine-readable storage medium encoded with instructions executable by a processor, the machine-readable storage medium comprising:
   instructions to receive an application installation file and a package file corresponding to a selected application, the package file indicating that the selected application may be executed and including an identifier corresponding to the installation file;
   instructions to install the application installation file and store the package file in a memory;
   instructions to receive a request to execute the selected application;
   instructions to determine if the package file corresponding to the selected application is stored in the memory;
   instructions to, if the package file corresponding to the selected application is stored in the memory, execute the application; and
   instructions to, if the package file corresponding to the selected application is not stored in the memory, display an error message,
   wherein the package file is generated by a package creator, and
   wherein the application installation file is retrieved from an application repository.

* * * * *